United States Patent
Sugai

(10) Patent No.: US 8,118,704 B2
(45) Date of Patent: Feb. 21, 2012

(54) VEHICLE AND CONTROL METHOD OF VEHICLE

(75) Inventor: Shinichi Sugai, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 409 days.

(21) Appl. No.: 12/524,480

(22) PCT Filed: Jan. 23, 2008

(86) PCT No.: PCT/JP2008/050899
§ 371 (c)(1),
(2), (4) Date: Jul. 24, 2009

(87) PCT Pub. No.: WO2008/090924
PCT Pub. Date: Jul. 31, 2008

(65) Prior Publication Data
US 2010/0081541 A1    Apr. 1, 2010

(30) Foreign Application Priority Data

Jan. 25, 2007   (JP) .................................. 2007-015485

(51) Int. Cl.
*B60W 10/06* (2006.01)
*B60W 10/08* (2006.01)
*F16H 59/78* (2006.01)
(52) U.S. Cl. ............... 477/3; 477/98; 477/111

(58) Field of Classification Search ............... 477/3, 98, 477/111
See application file for complete search history.

(56) References Cited

U.S. PATENT DOCUMENTS

2007/0259755 A1* 11/2007 Tanishima ..................... 477/3
2008/0032855 A1*  2/2008 Sah et al. ...................... 477/3

FOREIGN PATENT DOCUMENTS

| JP | 10-341583 A | 12/1998 |
| JP | 2001-103617 A | 4/2001 |
| JP | 2002-336738 A | 11/2002 |
| JP | 2004-278712 A | 10/2004 |
| JP | 2006-081324 A | 3/2006 |
| JR | 10-257605 A | 9/1998 |

* cited by examiner

*Primary Examiner* — Edwin A Young
(74) *Attorney, Agent, or Firm* — Kenyon & Kenyon LLP

(57) ABSTRACT

In response to a starting instruction of an engine at a gearshift position of a gearshift lever set to a parking position, a motor is controlled to form a fixed magnetic field on a stator of the motor at the level that is capable of preventing rotation of a rotating shaft against a torque applied to the rotating shaft within magnitude less than or equal to magnitude of a rotation restriction control torque based on a temperature of the motor and a discharge power from the battery, a motor is controlled to perform the motoring of the engine while the motor outputs a torque that makes a torque applied to the rotating shaft less than or equal to magnitude of the rotation restriction control torque, and the engine is controlled to be started with the motoring.

10 Claims, 9 Drawing Sheets

VEHICLE AND CONTROL METHOD OF VEHICLE

This is a 371 national phase application of PCT/JP2008/050899 filed 23 Jan. 2008, claiming priority to Japanese Patent Application No. JP 2007-015485 filed 25 Jan. 2007, the contents of which are incorporated herein by reference.

TECHNICAL FIELD

The present invention relates to a vehicle and a control method of the vehicle.

BACKGROUND ART

A proposed configuration of a vehicle includes an engine, a planetary gear mechanism constructed to have a carrier linked with an crankshaft of the engine and a ring gear linked with drive wheels, a first motor linked with a sun gear of the planetary gear mechanism, a second motor linked with the ring gear, and a battery arranged to transfer electric power to and from the first motor and the second motor (see, for example, Patent Document 1). According to the vehicle, in response to a starting demand of the engine when the vehicle is parked, a lock position is first set based on a rotational position of the rotor of the second motor, for example, is selected as one of six. The ring gear is locked by the flow of electric current through two, phases corresponding to the set lock position among three phases to form the fixed magnetic field on a stator of the second motor. After locking the ring gear, the engine is motored by means of the first motor and started. This arrangement prevents occurrence of a shock or a tremor when the engine is started.

Patent Document 1: Japanese Patent Laid-Open No. 2006-81324

DISCLOSURE OF THE INVENTION

In a vehicle equipped with a multistage transmission located between the ring gear of the planetary gear mechanism and an axle of the vehicle in addition to the above hardware configuration, at a gearshift position set to a parking position, the ring gear is generally disconnected from the axle by means of the multistage transmission, while the axle is locked. In this state, restriction of rotation of the ring gear is demanded for reduction of the shock when the ring gear is connected to the drive wheels by means of the multistage transmission in response to the setting of the gearshift position of a gearshift lever from the parking position to a driving position, and for cancellation of a torque applied to the ring gear while the engine is motored by means of the first motor to be started or stopped or while the engine is operated. The ring gear may be unable to be locked with a sufficient level due to insufficient flow of the electric current through the second motor depending on a state of the second motor or a state of the battery. It is, however, demanded to prevent the rotation of the ring gear in this occasion.

In a vehicle of the invention equipped with an internal combustion engine, a motoring structure, and a transmission unit configured to allow and prohibit a transmission of power with a change in speed between a rotating shaft connected with a motor and an axle of the vehicle, and a control method of such the vehicle, the object of the invention is to enable restriction of rotation of the rotating shaft while engine is motored and started at a gearshift position set to a parking position. In the vehicle of the invention equipped with the transmission and the control method of such the vehicle, the another object of the invention is to enable restriction of rotation of the rotating shaft in consideration of at least one of a state of the motor and a state of the accumulator unit.

At least part of the above and the other related demands is attained by a vehicle of the invention and a control method of the vehicle having the configurations discussed below.

According to one aspect, the present invention is directed to a vehicle. The vehicle comprises: an internal combustion engine; a motoring structure connected with an output shaft of the internal combustion engine and a rotating shaft and configured to perform a motoring of the internal combustion engine while outputting power to the rotating shaft; a motor that has a rotor connected with the rotating shaft and drives and rotates the rotor by a rotating magnetic field formed on a stator to input and output the power from and to the rotating shaft; an accumulator unit that transfers electric power to and from the motoring structure and the motor; a transmission unit configured to allow and prohibit transmission of power with a change in speed between the rotating shaft and an axle of the vehicle; and a control module configured to, in response to a starting instruction of the internal combustion engine at a gearshift position set to a parking position, control the motor to fix a direction of a magnetic field formed on the stator with a level that is capable of restricting rotation of the rotating shaft against a shaft driving force defined as driving force applied to the rotating shaft within a driving force range set based on at least one of a state of a motor system including the motor and a state of the accumulator unit, control the motoring structure to perform a motoring of the internal combustion engine while outputting driving force that makes the shaft driving force within the driving force range, and control the internal combustion engine to be started with the motoring by the motoring structure.

In response to a starting instruction of the internal combustion engine at a gearshift position set to a parking position, the vehicle according to this aspect of the invention controls the motor to fix a direction of a magnetic field formed on the stator with a level that is capable of restricting rotation of the rotating shaft against a shaft driving force defined as driving force applied to the rotating shaft within a driving force range set based on at least one of a state of a motor system including the motor and a state of the accumulator unit, controls the motoring structure to perform a motoring of the internal combustion engine while outputting driving force that makes the shaft driving force within the driving force range, and controls the internal combustion engine to be started with the motoring by the motoring structure. At the gearshift position set to the parking position, an axle of the vehicle is generally locked and the transmission unit separates the rotating shaft from the axle of the vehicle. In response to a starting instruction of the internal combustion engine at a state that the rotating shaft is separated from the axle, the vehicle of this aspect of the invention performs the motoring of the engine and starts the engine while the motoring structure outputs the driving force that makes the shaft driving force within the driving force range that enables restriction of rotation of the rotating shaft by means of the motor. This arrangement effectively prevents rotation of the rotating shaft. Additionally, the vehicle of this aspect of the invention sets the driving force range based on the at least one of the state of the motor system and the state of the accumulator unit. This arrangement effectively prevents rotation of the rotating shaft based on the driving force range set in consideration of these states. The terminology 'motoring system' in specification hereof includes a drive circuit for driving the motor, as well as the motor.

In one preferable application of the vehicle of the invention, the driving force range is set to a narrower range when a temperature of the motor system is more than a preset temperature than a range that is set when the temperature of the motor system is less than or equal to the preset temperature. An electric current flowing through the motor is comparatively small when the temperature of the motor system is relatively high, in the case of applying an increasing electric current through the motor with an increase of the driving force range. Therefore, the vehicle of the application enables suppression of an excessive increase of the temperature of the motor system. Additionally, the vehicle performs the motoring of the engine while the motoring structure outputs the driving force that makes the shaft driving force within the driving force range. The vehicle of the application effectively prevents rotation of the rotating shaft even when the electric current flowing through the motor is relatively decreased. In this application, the vehicle further has: a temperature rise estimating module configured to estimate that the temperature of the motor system may rise over the preset temperature. The driving force range is set to a narrower range when the temperature rise estimating module estimates the temperature of the motor system may rise over the preset temperature than a range that is set when the temperature rise estimating module does not estimate that the temperature of the motor system may rise over the preset temperature. The vehicle of this application more effectively enables suppression of the excessive increase of the temperature of the motor system.

In another preferable application of the vehicle of the invention, the driving force range is set to a narrower range when a discharge power from the accumulator unit is over a preset electric power based on an output limit of the accumulator unit than a range that is set when the discharge power from the accumulator unit is less than or equal to the preset electric power. An electric current flowing through the motor is comparatively small when the discharge power from the accumulator unit is over the preset electric power, in the case of applying an increasing electric current through the motor with an increase of the driving force range. Therefore, the vehicle of the application enables suppression of an excessive increase of the discharge power from the accumulator unit. Additionally, the vehicle performs the motoring of the engine while the motoring structure outputs the driving force that makes the shaft driving force within the driving force range. The vehicle of the application effectively prevents rotation of the rotating shaft even when the electric current flowing through the motor is relatively decreased. In this application, the vehicle further has: an electric power excess estimating module configured to estimate that the discharge power from the accumulator unit may exceed the preset electric power. The driving force range is set to a narrower range when the electric power excess estimating module estimates that the discharge power from the accumulator unit may exceed the preset electric power than a range that is set when the electric power excess estimating module does not estimate that the discharge power from the accumulator unit may exceed the preset electric power. The vehicle of this application more effectively enables suppression of the excessive increase of the discharge power from the accumulator unit.

In one preferable embodiment of the vehicle of the invention, the control module sets a target driving force to be output from the motoring structure, calculates an estimated shaft driving force estimated to be applied to the rotating shaft based on the target driving force, and sets the driving force range based on the estimated shaft driving force and at least one of the state of the motor system and the state of the accumulator unit.

In another preferable embodiment of the vehicle of the invention, the control module controls the motoring structure to output the driving force that makes the driving force applied to the rotating shaft within a second driving force range that is narrower than the driving force range. The vehicle of this application more effectively enables restriction of rotation of the rotating shaft.

In one preferable structure of the vehicle of the invention, the motoring structure is an electric power-mechanical power input output structure that is connected with the rotating shaft and with the output shaft of the internal combustion engine to enable rotation independently of the rotating shaft and inputs and outputs power into and from the output shaft and the rotating shaft through input and output of electric power and mechanical power. In this structure, the electric power-mechanical power input output structure includes: a three shaft-type power input output assembly connected with three shafts, the rotating shaft, the output shaft and a third shaft and designed to input and output power to a residual shaft based on powers input from and output to any two shafts among the three shafts; and a generator configured to input and output power from and to the third shaft.

According to another aspect, the present invention is directed to a control method of a vehicle. The vehicle comprises: an internal combustion engine; a motoring structure connected with an output shaft of the internal combustion engine and a rotating shaft and configured to perform a motoring of the internal combustion engine while outputting power to the rotating shaft; a motor that has a rotor connected with the rotating shaft and drives and rotates the rotor by a rotating magnetic field formed on a stator to input and output the power from and to the rotating shaft; an accumulator unit that transfers electric power to and from the motoring structure and the motor; and a transmission unit configured to allow and prohibit transmission of power with a change in speed between the rotating shaft and an axle of the vehicle. In response to a starting instruction of the internal combustion engine at a gearshift position set to a parking position, the control method controls the motor to fix a direction of a magnetic field formed on the stator with a level that is capable of restricting rotation of the rotating shaft against a shaft driving force defined as driving force applied to the rotating shaft within a driving force range set based on at least one of a state of a motor system including the motor and a state of the accumulator unit, controls the motoring structure to perform a motoring of the internal combustion engine while outputting driving force that makes the shaft driving force within the driving force range, and controls the internal combustion engine to be started with the motoring by the motoring structure.

In response to a starting instruction of the internal combustion engine at a gearshift position set to a parking position, the control method of the vehicle according to this aspect of the invention controls the motor to fix a direction of a magnetic field formed on the stator with a level that is capable of restricting rotation of the rotating shaft against a shaft driving force defined as driving force applied to the rotating shaft within a driving force range set based on at least one of a state of a motor system including the motor and a state of the accumulator unit, controls the motoring structure to perform a motoring of the internal combustion engine while outputting driving force that makes the shaft driving force within the driving force range, and controls the internal combustion engine to be started with the motoring by the motoring structure. At the gearshift position set to the parking position, axle is generally locked and the transmission unit separates the rotating shaft from the axle of the vehicle. In response to a starting instruction of the internal combustion engine at a state that the rotating shaft is separated from the axle, the control method of the vehicle of this aspect of the invention performs the motoring of the engine and starts the engine while the motoring structure outputs the driving force that makes the shaft driving force within the driving force range that enables restriction of rotation of the rotating shaft by means of the motor. This arrangement effectively prevents rotation of the rotating shaft. Additionally, the control method of the vehicle of this aspect of the invention sets the driving force range based on the at least one of the state of the motor system and the state of the accumulator unit. This arrangement effectively prevents rotation of the rotating shaft based on the driving force range set in consideration of these. The terminology 'motoring system' in specification hereof includes a drive circuit for driving the motor, as well as the motor.

BEST MODES OF CARRYING OUT THE INVENTION

One mode of carrying out the invention is described below as a preferred embodiment.

Figure 1:
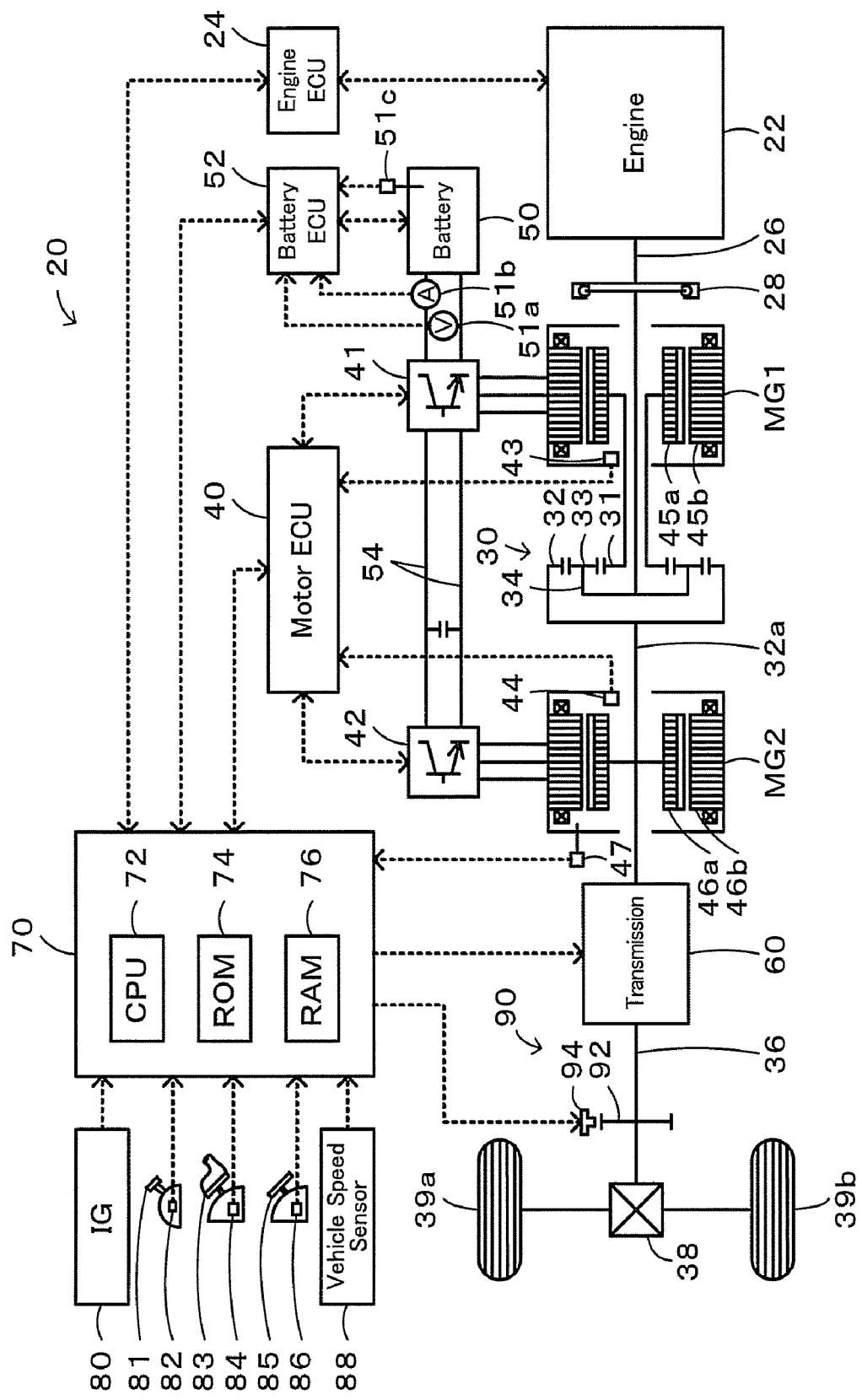
FIG. 1 schematically illustrates the configuration of a hybrid vehicle 20 in a first embodiment of the invention.

FIG. 1 schematically illustrates the configuration of a hybrid vehicle 20 in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is linked to the power distribution integration mechanism 30 and has power generation capability, a motor MG2 that is linked to a ring gear shaft 32a or a rotating shaft connected to the power distribution integration mechanism 30, a transmission 60 that converts power of the ring gear shaft 32a and outputs the converted power to a driveshaft 36 connected to drive wheels 39a and 39b, a parking lock mechanism 90 that locks the drive wheels 39a and 39b, and a hybrid electronic control unit 70 that controls the operations of the whole hybrid vehicle 20.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the ring gear shaft 32a as the rotating shaft. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the drive wheels 39a and 39b via the transmission 60, the driveshaft 36, and the differential gear 38 from ring gear shaft 32a.

Figure 2:
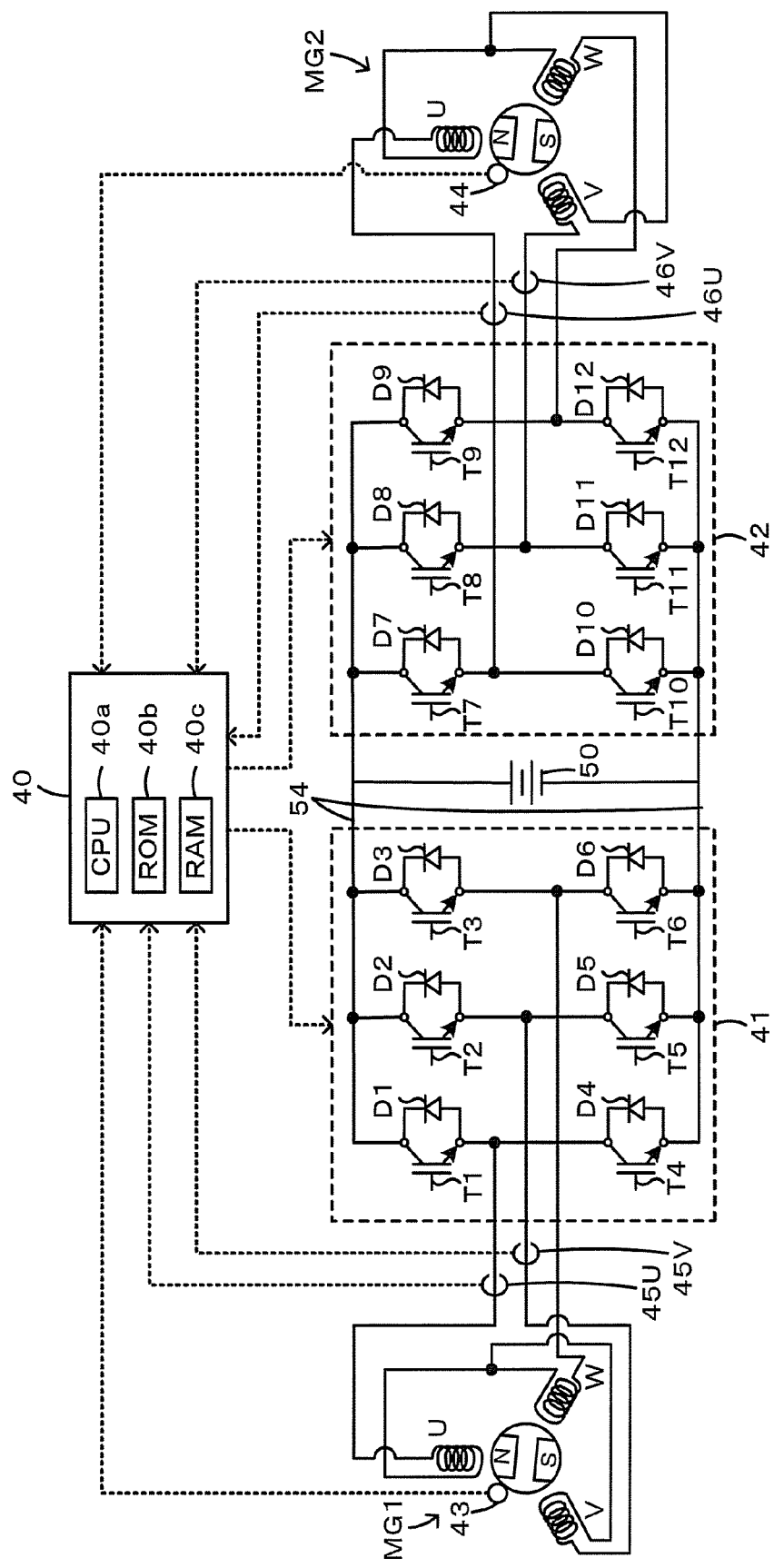
FIG. 2 schematically shows the structure of an electric driving system centered on motors MG1 and MG2 and battery 50.

FIG. 2 shows the schematic structure of an electric drive system including the motors MG1 and MG2 and battery 50 on the hybrid vehicle 20. As shown in FIGS. 1 and 2, the motors MG1 and MG2 respectively have rotors 45a and 46a with permanent magnets attached thereto and stators 45b and 46b with three phase coils wound thereon. The motors MG1 and MG2 are constructed as known synchronous motor generators that may be actuated both as a generator and as a motor. The motors MG1 and MG2 transmit electric power to and from a battery 50 via inverters 41 and 42. Each of the inverters 41 and 42 includes six transistors T1 to T6 or T7 to T12 and six diodes D1 to D6 or D7 to D12 connected in inverse parallel with the transistors T1 to T6 or T7 to T12. The six transistors T1 to T6 or T7 to T12 are arranged in pairs to function as the source and the sink to a positive bus connecting with a cathode of the battery 50 and to a negative bus connecting with an anode of the battery 50. Three phase coils (U phase, V phase, and W phase) of the motor MG1 or MG2 are connected to the connection points of the respective pairs of transistors T1 to T6 or T7 to T12. Regulation of the ratio of ON time of the respective pairs of the transistors T1 to T6 or T7 to T12 forms a rotating magnetic field in the three phase coils to drive and rotate the motor MG1 or MG2. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. The operations of both the motors MG1 and MG2 are controlled by a motor electronic control unit (hereafter referred to as motor ECU) 40. The motor ECU 40 is constructed as a microprocessor including a CPU 40$a$, a ROM 40$b$ for storage of processing programs, a RAM 40$c$ for temporary storage of data, an input port, an output port, and a communication port (not shown). The motor ECU 40 inputs signals required for driving and controlling the motors MG1 and MG2, for example, signals representing rotational positions θm1 and θm2 of the rotors 45$a$ and 46$a$ in the motors MG1 and MG2 from rotational position detection sensors 43 and 44 and phase currents Iu1, Iv1, Iu2 and Iv2 flowing through U phases and V phases of the three phase coils in the motors MG1 and MG2 from current sensors 45U, 45V, 46U and 46V. The motor ECU 40 outputs switching control signals to the transistors T1 to T6 included in the inverter 41 and to the transistors T7 to T12 included in the inverter 42. The motor ECU 40 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements.

The transmission 60 has brakes and clutches (not shown) and is constructed to couple and decouple the ring gear shaft 32$a$ or the rotating shaft with and from the driveshaft 36 and to change the rotation speed of the ring gear shaft 32$a$ at four speeds in the coupled state of the two shafts and transmit the changed speed to the driveshaft 36.

The parking lock mechanism 90 has a parking gear 92 attached to the driveshaft 36 and a parking lock pole 94 engaging with the parking gear 92 to lock the parking gear 92 in its rotation stop state. The parking lock pole 94 is actuated by an actuator (not shown), which is driven and controlled by the hybrid electronic control unit 70 in response to input of a gearshift signal from another gear position to a parking position or a gearshift signal from the parking position to another gear position. The parking lock pole 94 is engaged with and disengaged from the parking gear 92 to enable and release the parking lock. The driveshaft 36 is mechanically linked to the drive wheels 39$a$ and 39$b$. The parking lock mechanism 90 thus indirectly locks the drive wheels 39$a$ and 39$b$.

The battery 50 is under control of a battery electronic control unit (hereafter referred to as battery ECU) 52. The battery ECU 52 receives diverse signals required for control of the battery 50, for example, an inter-terminal voltage Vb measured by a voltage sensor 51$a$ disposed between terminals of the battery 50, a charge-discharge current Ib measured by a current sensor 51$b$ attached to the power line 54 connected with the output terminal of the battery 50, and a battery temperature Tb measured by a temperature sensor 51$c$ attached to the battery 50. The battery ECU 52 outputs data relating to the state of the battery 50 to the hybrid electronic control unit 70 via communication according to the requirements. The battery ECU 52 calculates a state of charge SOC of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: a temperature αm2 of the motor MG2 from a temperature sensor 47 that measures a temperature of the motor MG2, an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 outputs, via its output port, driving signals to the actuator for the brakes and clutches (not shown) of the transmission 60 and driving signals to the actuator (not shown) for the parking lock mechanism 90. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

In the hybrid vehicle 20 of the embodiment, the gearshift position SP of the gearshift lever 81 detected by the gearshift position sensor 82 has multiple different options: parking position (P position), neutral position (N position), drive position (D position) for forward drive of the vehicle, and reverse position (R position) for reverse drive of the vehicle. At the gearshift position of the gearshift lever 81 set to the parking position, the brakes and clutches (not shown) of the transmission 60 are released to disconnect the ring gear shaft 32$a$ or the rotating shaft from the driveshaft 36.

The hybrid vehicle 20 of the embodiment thus constructed calculates a torque demand to be output to the ring gear shaft 32$a$ functioning as the rotating shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32$a$. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32$a$. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32$a$, simultaneously with charge or discharge of the battery 50. The motor drive mode stops the operations of the engine 22 and drives and controls the motor MG2 to output a quantity of power equivalent to the required level of power to the ring gear shaft 32$a$.

Figure 3:
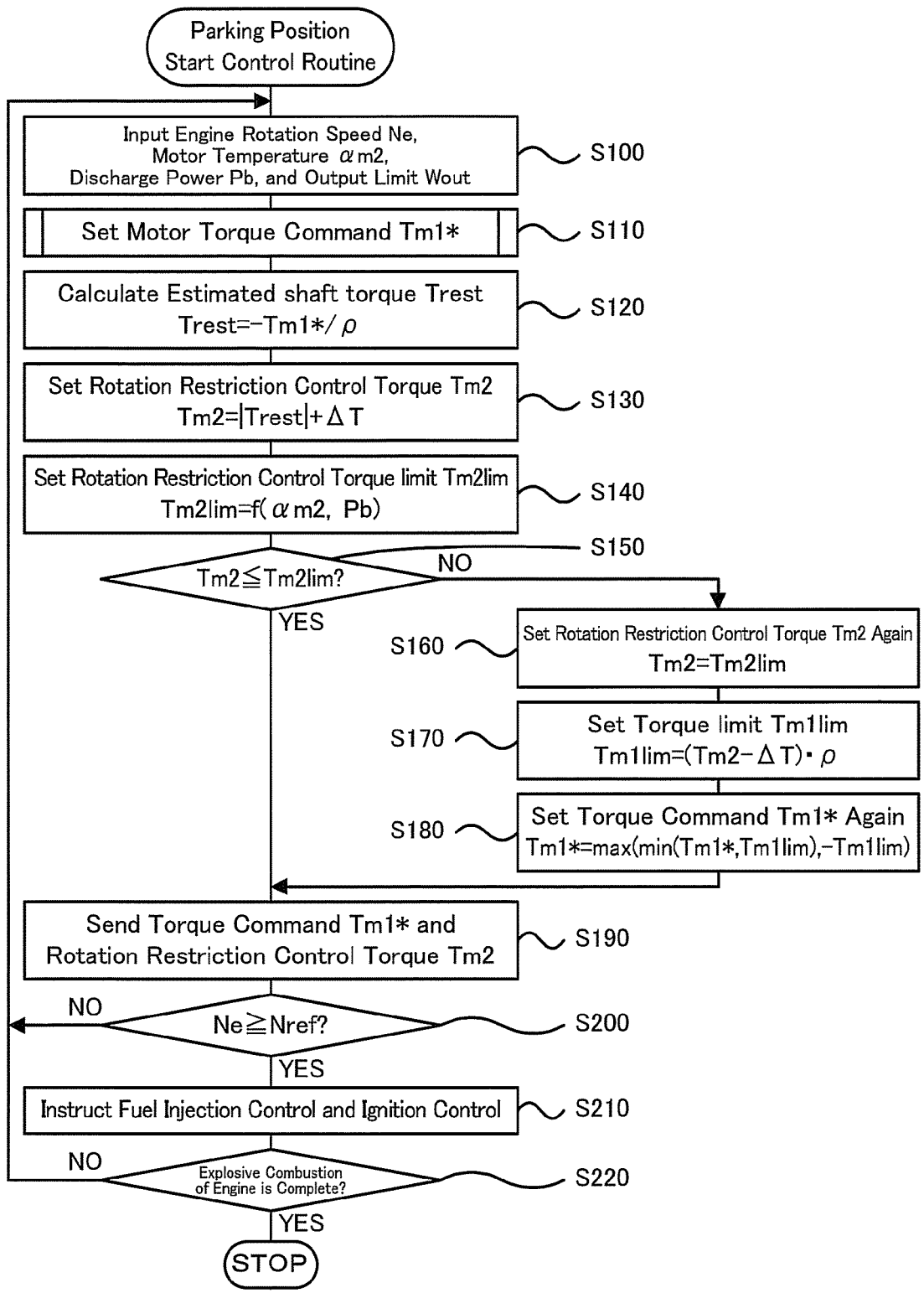
FIG. 3 is a flowchart showing a parking position start control routine executed by the hybrid electronic control unit 70.

The description regards the operations of the hybrid vehicle 20 of the embodiment having the configuration discussed above, especially a series of operation control at the gearshift position of the gearshift lever 81 set to the parking position. FIG. 3 is a flowchart showing a parking position start control routine executed by the hybrid electronic control unit 70. This routine is triggered by a starting instruction of the engine 22 at the gearshift position of the gearshift lever 81 set to the parking position.

In the parking position start control routine, the CPU 72 of the hybrid electronic control unit 70 first inputs various data required for control, that is, the temperature $\alpha$m2 of the motor MG2 from the temperature sensor 47, a rotation speed Ne of the engine 22, a discharge power Pb from the battery 50 and an output limit Wout of the battery 50 (step S100). The rotation speed Ne of the engine 22 is computed from a signal output from a crank position sensor (not shown) attached to the crankshaft 26 and is input from the engine ECU 24 by communication. The discharge power Pb is calculated as the product of the inter-terminal voltage Vb measured by the voltage sensor 51a and the charge-discharge current Ib measured by the current sensor 51b and is input from the battery ECU 52 by communication. The output limit Wout of the battery 50 is set based on the battery temperature Tb measured by the temperature sensor 51c and the state of charge SOC of the battery 50 and is input from the battery ECU 52 by communication.

Figure 4:
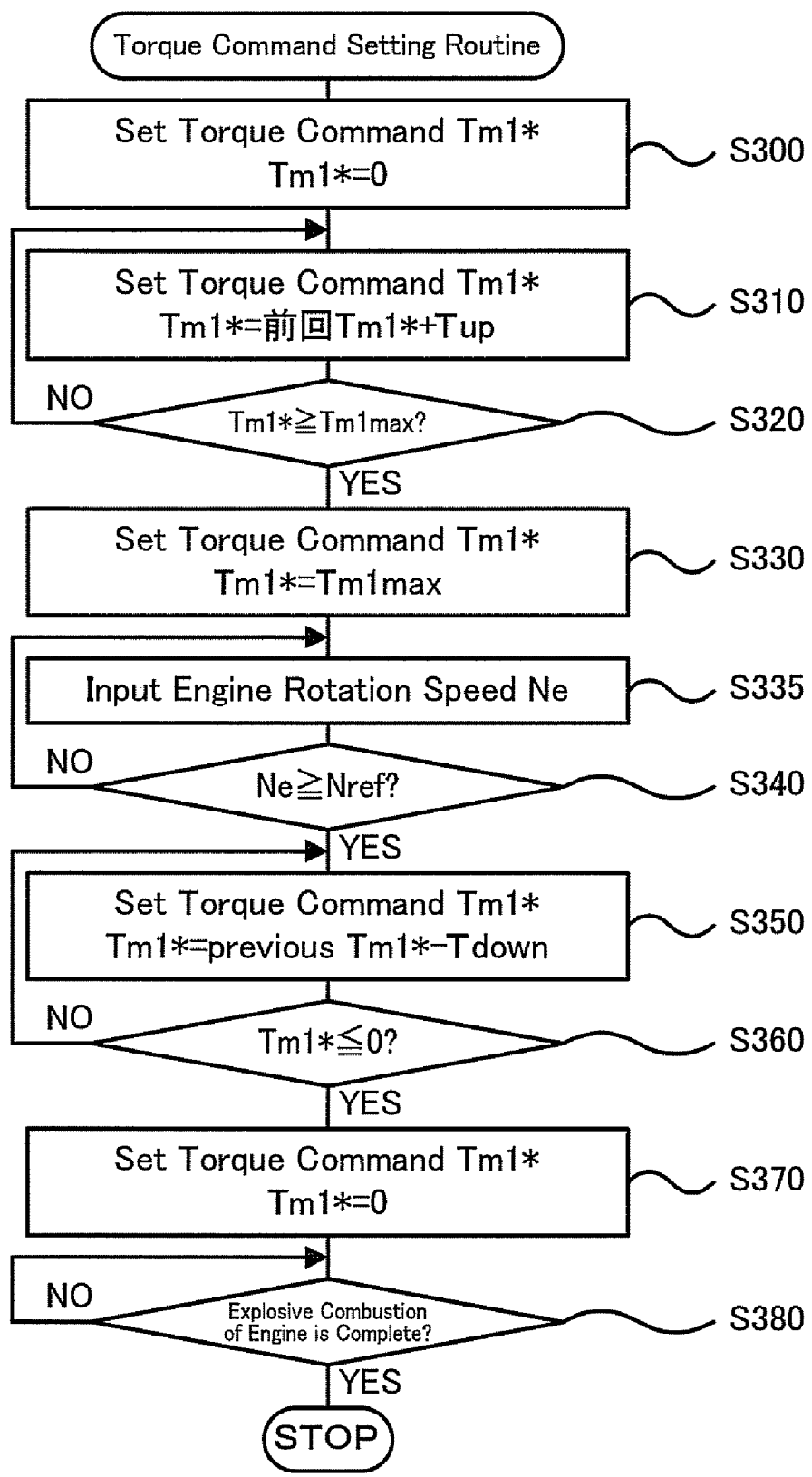
FIG. 4 is a flowchart showing a torque command setting routine.

After the data input, the CPU 72 sets a torque command Tm1* of the motor MG1 or a motoring torque for performing a motoring of the engine 22 (step S110). This torque command Tm1* of the motor MG1 in this embodiment is set by means of a torque command setting routine. This routine is shown in the flowchart of FIG. 4 and executed by the hybrid electronic control unit 70 in parallel with the parking position start control routine of FIG. 3. The details of the torque command setting routine of FIG. 4 is described with suspension of the description of the parking position start control routine of FIG. 3.

In the torque command setting routine, the CPU 72 first sets the torque command Tm1* of the motor MG1 to 0 (step S300). The CPU 72 then performs the processing of setting the torque command Tm1* with an increase of the torque command Tm1* by an increasing rate Tup until the torque command Tm1* of the motor MG1 reaches a maximum torque Tm1max (steps S310 and S320). When the torque command Tm1* of the motor MG1 reaches more than or equal to the maximum torque Tm1max, the CPU 72 sets the torque command Tm1* of the motor MG1 to the maximum torque Tm1max (step S330), inputs the rotation speed Ne of the engine 22 (step S335), waits for the rotation speed Ne of the engine 22 to reach more than or equal to a predetermined reference value Nref (step S340). The increasing rate Tup is the extent of increasing the torque command Tm1* and is determined according to a time interval at which the processing of increasing the torque command Tm1* by the increasing rate Tup is repeatedly executed. The maximum torque Tm1max is set as a torque that is capable of performing the motoring of the engine 22 to the rotation speed more than or equal to the predetermined reference value Nref, and is determined according to the characteristics of the engine 22 and the motor MG1. The predetermined reference value Nref is the rotation speed that fuel injection control and ignition control is started. When the rotation speed Ne of the engine 22 reaches the predetermined reference value Nref (step S340), the CPU 72 performs the processing of setting the torque command Tm1* with a decrease of the torque command Tm1* by a decreasing rate Tdown until the torque command Tm1* of the motor MG1 reaches less than or equal to 0 (steps S350 and S360). When the torque command reaches less than or equal to 0, the CPU 72 sets the torque command Tm1* of the motor MG1 to 0 (step S370), waits for complete explosive combustion of the engine 22 (step 380). Upon complete explosive combustion of the engine 22, the torque command setting routine is terminated. The decreasing rate Tdown is the extent of decreasing the torque command Tm1* and is determined according to a time interval at which the processing of decreasing the torque command Tm1* by the decreasing rate Tdown is repeatedly executed.

The explanation of the parking position start control routine of FIG. 3 is resumed. After setting the torque command Tm1* of the motor MG1 at step S110, the CPU 72 calculates a estimated shaft torque Trest, that is, a torque estimated to be applied to the ring gear shaft 32a or the rotating shaft when a torque corresponding to the torque command Tm1* is output from the motor MG1, from the torque command Tm1* and a gear ratio ρ of the power distribution integration mechanism 30 according to Equation (1) given below (step S120):

$$Trest = -Tm1^*/\rho \qquad (1)$$

Figure 5:
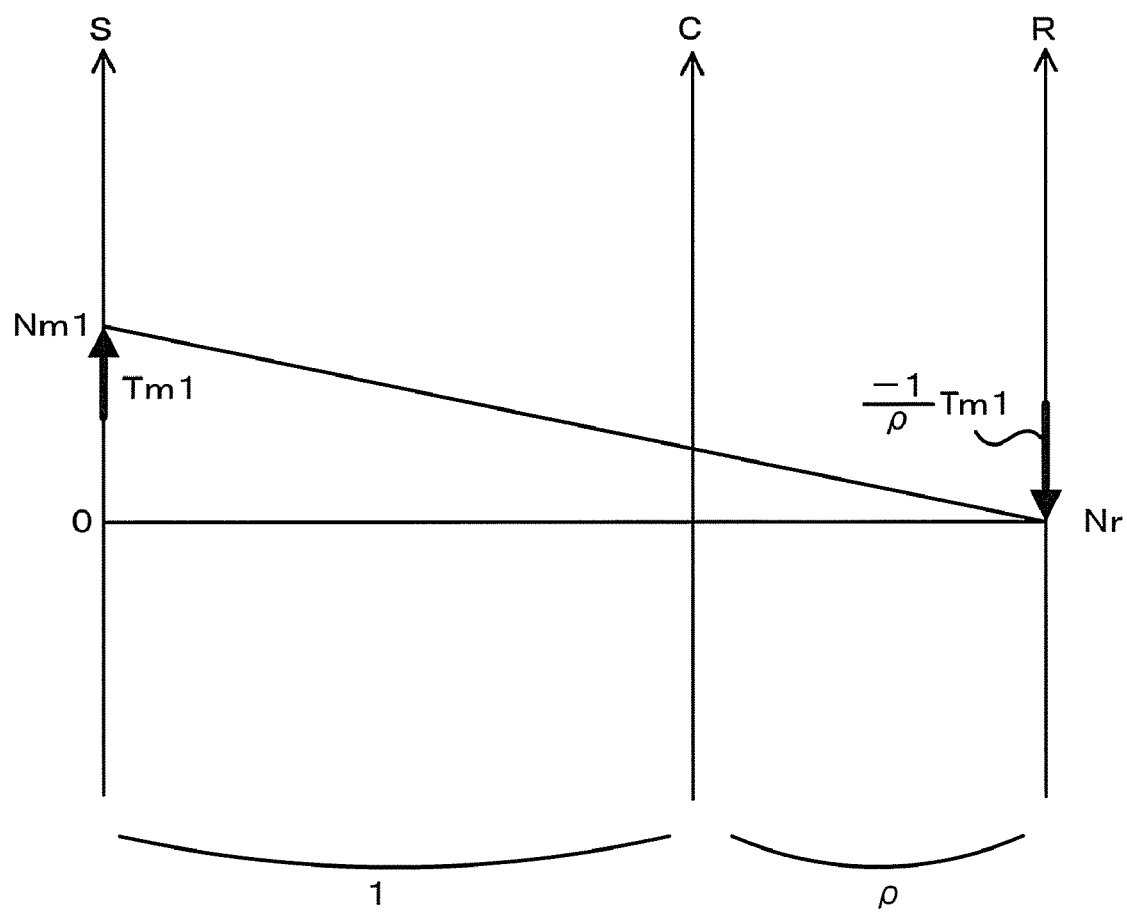
FIG. 5 is an alignment chart showing torque-rotation speed dynamics of the rotational elements included in the power distribution integration mechanism 30.

The alignment chart of FIG. 5 shows torque-rotation speed dynamics of the rotational elements included in the power distribution integration mechanism 30 at the time when the motoring of the engine 22 is performed by means of the motor MG1. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents a rotation speed of ring gear 32 (ring gear shaft 32a) that is equivalent to the rotation speed Nm2 of the motor MG2. A thick arrow on the axis 'R' respectively shows a torque applied to the ring gear shaft 32a by the torque Tm1 output from the motor MG1. Equation (1) is readily introduced from the alignment chart.

Figure 6:
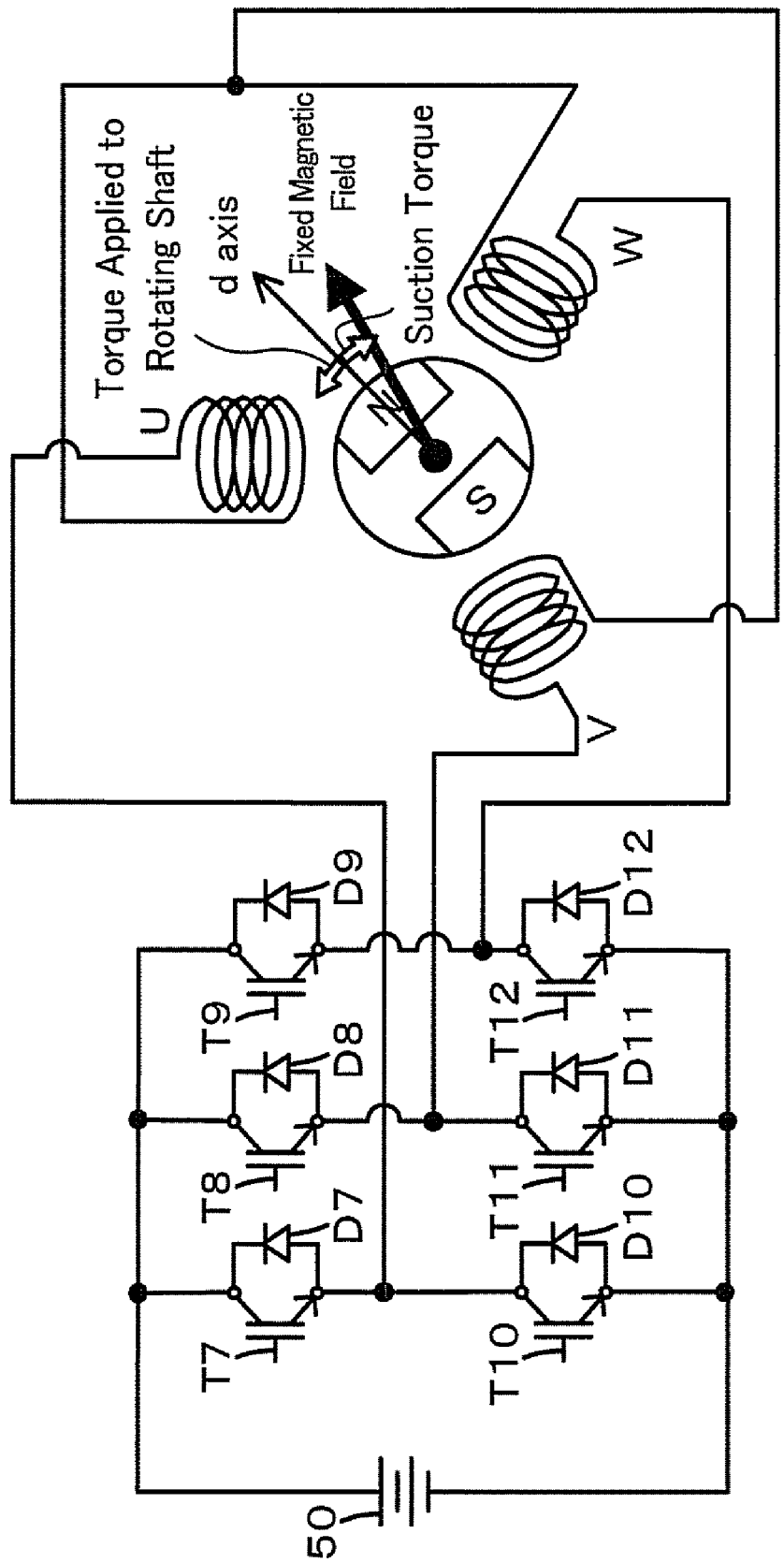
FIG. 6 shows the rotation restriction control.

Then the CPU 72 sets a rotation restriction control torque Tm2 to the sum of the absolute value of the estimated shaft torque Trest and a predetermined torque ΔT (step S130). The rotation restriction control torque Tm2 is a torque that is used for setting the value of the electric current required to flow through three phase coils of the motor MG2 while the CPU 72 performs control for restricting rotation of the rotor 46a (the ring gear shaft 32a or the rotating shaft) of the motor MG2 by fixing a direction of a magnetic field formed on the stator 46b (hereafter referred to as rotation restriction control). This rotation restriction control torque Tm2 in the embodiment is set more than or equal to 0. As the predetermined torque ΔT, it is possible to use magnitude equal to or slightly more than magnitude of a torque, which might be applied to the ring gear shaft 32a by means of an inertia of a rotating system comprising the engine 22 and the motor MG1 or by means of disturbances when the engine 22 is motored and started by means of the motor MG1. The predetermined torque ΔT is experimentally determined. FIG. 6 shows the rotation restriction control. When the motor MG2 is controlled, as shown in FIG. 6, a composite magnetic field (shown by the thick arrow of solid line) is formed on the stator 46b of the motor MG2 as combination of the magnetic fields formed respectively on the U phase, the V phase, and the W phase with application of electric currents. In the rotation restriction control, the motor MG2 is controlled to prohibit rotation of this composite magnetic field. This composite magnetic field that does not rotate is hereafter referred to as fixed magnetic field. When the direction of the fixed magnetic field is identical with the direction of the magnetic field formed by the permanent magnets on the rotor 46a of the motor MG2 (that is, the direction of the axis 'd' in the d-q coordinate system), no torque is output from the motor MG2 to the ring gear shaft 32a or the rotating shaft. The torque applied to the ring gear shaft 32a rotates the rotor 46a to deviate the current direction of the magnetic field of the rotor 46a (the direction of the axis 'd')

from the direction of the fixed magnetic field formed on the stator 46b. A torque depending on the deviation of the current direction of the magnetic field of the rotor 46a from the fixed magnetic field formed on the stator 46b is then applied to the rotor 46a to make the current direction of the magnetic field of the rotor 46a substantially match with the fixed magnetic field formed on the stator 46b (hereafter this torque is referred to as suction torque). The rotor 46a stops at the position where the torque applied to the ring gear shaft 32a is balanced with the suction torque. The suction torque increases with an increase of the deviation of the current direction of the magnetic field of the rotor 46a from the direction of the fixed magnetic field within a range of an electric angle of $\pi/2$, and increases with an increase of the electric current flowing through three phase coils of the stator 46b to form the fixed magnetic field. The rotation restriction control torque Tm2 is used to determine the value of an electric current required to flow through three phase coils. In the embodiment, the value of the electric current is set to increase with an increase of the rotation restriction control torque Tm2 and is set to be capable of preventing rotation of the ring gear shaft 32a against the torque applied to the ring gear shaft 32a at magnitude that is less than or equal to the rotation restriction control torque Tm2 (within the range of a torque −Tm2 to a torque Tm2). When the torque corresponding to the torque command Tm1* is output from the motor MG1, the torque applied to the ring gear shaft 32a is within the range of the torque −Tm2 to the torque Tm2. Therefore, applying the electric current corresponding to such set electric current through the three phase coils of the stator 46b of the motor MG2 enables restriction of rotation of the ring gear shaft 32a. The details of such control of the motor MG2 will be described later. In the d-q coordinate system, the axis 'd' represents the direction of the magnetic field formed by the permanent magnets attached to the rotor 46a, and the axis 'q' represents the direction advanced from the axis 'd' by an electrical angle of $\pi/2$.

Figure 7:
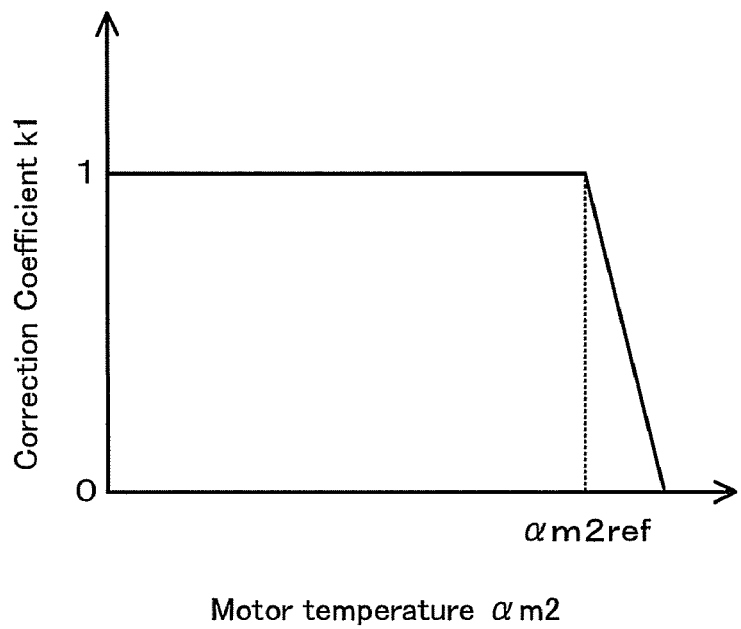
FIG. 7 shows one example of a correction coefficient setting map.
Figure 8:
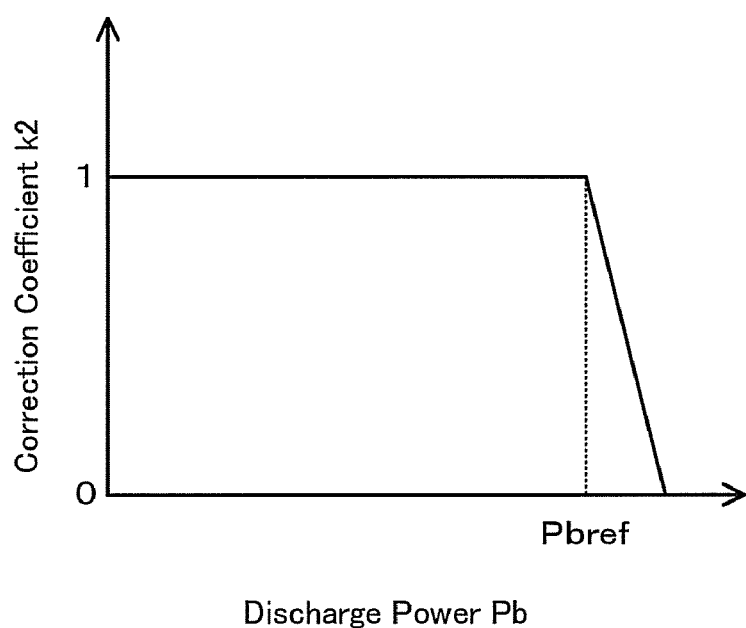
FIG. 8 shows one example of a correction coefficient setting map.

The CPU 72 sets a rotation restriction control torque limit Tm2lim based on the temperature αm2 of the motor MG2 and the discharge power Pb from the battery 50 (step S140). The rotation restriction control torque limit Tm2lim in this embodiment is set as the product of a basic value Tm2limtmp, a correction coefficient k1 based on the temperature αm2 of the motor MG2, and a correction coefficient k2 based on the discharge power Pb from the battery 50. The relation between the temperature αm2 of the motor MG2 and the correction coefficient k1 is shown in FIG. 7. The relation between the discharge power Pb and the correction coefficient k2 is shown in FIG. 8. The correction coefficient k1 in FIG. 7 is set to 1 when the temperature αm2 of the motor MG2 is not higher than a predetermined temperature αm2ref, and is set to decrease to 0 with an increase of the temperature αm2 when the temperature αm2 is higher than the predetermined temperature αm2ref. As the predetermined temperature αm2ref, it is possible to use a temperature equal to or slightly less than a predetermined allowable temperature of the motor MG2. The correction efficient k2 in FIG. 8 is set to 1 when the discharge power Pb from the battery 50 is equal to or less than a predetermined electric power Pbref, and is set to decrease to 0 with an increase of excess of the discharge power Pb over the predetermined power Pbref when the discharge power Pb is more than the predetermined electric power Pbref. As the determined power Pbref, it is possible to use the power corresponding to or slightly less than the output limit Wout of the battery 50. By such the setting of the correction coefficient k1 and the correction coefficient k2, the rotation restriction control torque limit Tm2lim is set to the basic value Tm2limtmp when the temperature αm2 of the motor MG2 is not higher than the predetermined temperature αm2ref and the discharge power Pb is equal to or less than the predetermined electric power Pbref, and is set to the value, depending on the temperature αm2 of the motor MG2 and the discharge power Pb from the battery 50, less than the basic value Tm2limtmp when the temperature αm2 of the motor MG2 is higher than the predetermined temperature or when the discharge power Pb is more than the predetermined electric power pbref. The reason why the rotation restriction control torque limit Tm2lim is set in such the way will be described later.

After setting the rotation restriction control torque limit Tm2lim, the CPU 72 compares the rotation restriction control torque Tm2 with the rotation restriction control torque limit Tm2lim (step S150). The comparison of the rotation restriction control torque Tm2 with the rotation restriction control torque limit Tm2lim is the processing for determining whether execution of the rotation restriction control with the use of the rotation restriction control torque Tm2 set at step S130 is permitted or not, in consideration of the temperature αm2 of the motor MG2 and the discharge power Pb from the battery 50 when the torque corresponding to the torque command Tm1* is output from the motor MG1. When the rotation restriction control torque Tm2 is equal to or less than, the rotation restriction control torque limit Tm2lim, it is determined that executing the rotation restriction control with the use of the rotation restriction control torque Tm2 set at step S130 is permitted. The CPU 72 then sends the torque command Tm1* of the motor MG1 and the rotation restriction control torque Tm2 to the motor ECU 40 (step s190). The motor ECU 40 receives the settings of the torque command Tm1* and the rotation restriction control torque Tm2, performs switching control of switching elements included in the inverter 41 to drive the motor MG1 with the torque command Tm1*, executes a rotation restriction control torque reception second motor control routine shown in FIG. 9 described below. The motor MG1 is controlled to output the torque corresponding to the torque command Tm1*, that is, the torque that makes the torque (−Tm1*/ρ) applied to the ring gear shaft 32a within the range of the torque −Tm2 to the torque Tm2. The motor MG2 is controlled to enable to prevent rotation of the ring gear shaft 32a against the torque applied to the ring gear shaft 32a within the range of the torque −Tm2 to the torque Tm2. This arrangement effectively prevents rotation of the ring gear shaft 32a when the engine 22 is motored and started by means of the motor MG1.

When the rotation restriction control torque Tm2 is more than the rotation restriction control torque limit Tm2lim, on the other hand, the CPU 72 sets the rotation restriction control torque limit Tm2lim as the rotation restriction control torque Tm2 again (step S160). The CPU 72 subsequently calculates a torque limit Tm1lim of the motor MG1 from the set rotation restriction control torque Tm2, the predetermined torque ΔT and the gear ratio ρ of the power distribution integration mechanism 30 according to Equation (2) given below (step S170):

$$Tm1lim = (Tm2 - \Delta T) \cdot \rho \qquad (2)$$

The CPU 72 then limits the torque command Tm1* of the motor MG1 set at step S110 to the range between the lower torque limit −Tm1lim and the upper torque limit Tm1lim to set the torque command Tm1* again (step S180). The CPU 72 sends the set torque command Tm1* and the set rotation restriction control torque Tm2 to the motor ECU 40 (step S190). The CPU 72 sets the rotation restriction control torque Tm2 to the rotation restriction control torque limit Tm2lim reflecting the temperature αm2 of the motor MG2 and the discharge power Pb from the battery 50, at step 160 again.

Such setting enables suppression of an excessive increase of the temperature αm2 of the motor MG2 and an excessive increase of the discharge power Pb from the battery 50. The CPU 72 also sets the torque command Tm1* that makes a torque applied to the ring gear shaft 32a or the rotating shaft within the range (the range of a torque (−Tm2+ΔT) to a torque (Tm2−ΔT)), which is narrower than the range (the range of the torque −Tm2 to the torque Tm2) corresponding to the rotation restriction control torque Tm2 equal to the rotation restriction control torque limit Tm2lim, at the steps S170 and S180 again. Such setting enables restriction of rotation of the ring gear shaft 32a at the time when the engine 22 is motored by means of the motor MG1.

The CPU 72 compares the rotation speed Ne of the engine 22 with the predetermined reference value Nref (step S200). When the rotation speed Ne of the engine 22 has not yet reached the predetermined reference value Nref, the parking position start control routine goes back to step S100. When the rotation speed Ne of the engine 22 has reached the predetermined reference value Nref by the motoring of the engine 22 with the torque output from the motor MG1 (step S200), the CPU 72 sends the instruction of fuel injection control and ignition control to the engine ECU 24 (step S210). The engine ECU 24 receives the instruction and performs the fuel injection control and the ignition control of the engine 22. The CPU 72 identifies complete or incomplete explosive combustion of the engine 22 (step S220). Upon identification of incomplete explosive combustion of the engine 22, the parking position start control routine goes back to step S100. Upon identification of complete explosive combustion of the engine 22, the parking position start control routine is then terminated.

Figure 9:
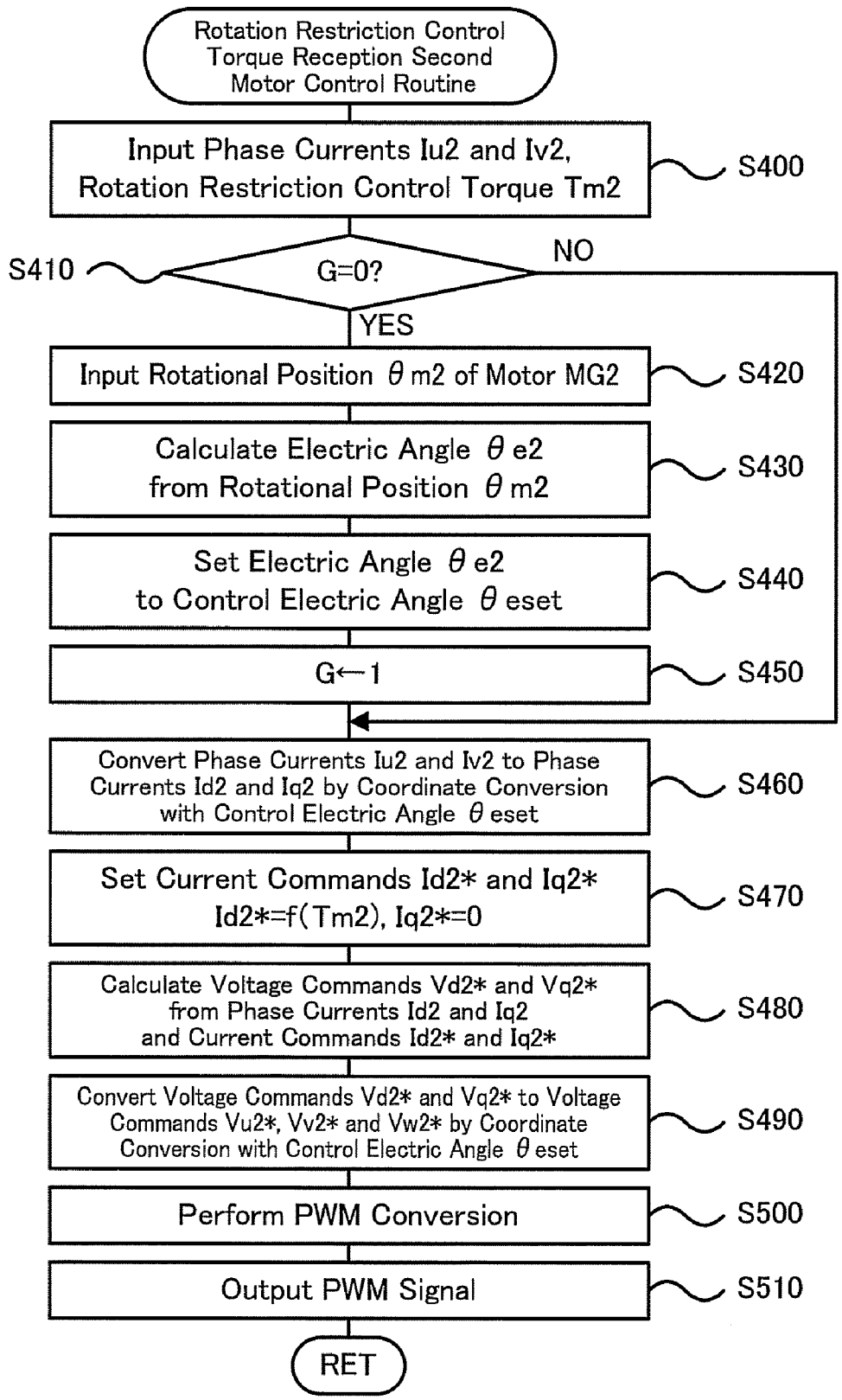
FIG. 9 is a flowchart showing a rotation restriction control torque reception second motor control routine.

The description regards the rotation restriction control torque reception second motor control routine that is executed by the motor ECU 40 and is shown in FIG. 9. This routine is triggered by receiving the rotation restriction control torque Tm2 from the hybrid electronic control unit 70. In the rotation restriction control torque reception second motor control routine, the CPU 40a of the motor ECU 40 first inputs various data required for control, that is, the phase currents Iu2 and Iv2 flowing through the U phase and the V phase of the three-phase coils from the current sensors 46U and 46V, and the rotation restriction control torque Tm2 (step S400). The rotation restriction control torque Tm2 is set at the parking position start control and is input from the hybrid electronic control unit 70.

The CPU 40a identifies the value of the flag G (step S410). Upon identification of the flag G equal to 0, the CPU 40a inputs the rotational position θm2 of the rotor 46a in the motor MG2 from the rotational position detection sensor 44 (step S420). Then The CPU 40a calculates an electric angle θe2 based on the rotational position θm2 of the rotor 46a in the motor MG2 (step S430), sets the calculated electric angle as the control electric angle θeset (step S440), sets flag G to 1 (step S250). After setting flag G to 1, the processing of step S420 to S450 is skipped. Flag G is set to 0 as initial value and is set to 1 in response to the setting of the control electric angle θeset. The processing of step S420 to S450 sets the control electric angle θeset from the rotational position θm2 of the rotor 46a in the motor MG2 at the time when this routine is first executed by a starting instruction of the engine 22 at the gearshift position SP set to the parking position.

The input phase currents Iu2 and Iv2 are converted to electric currents Id2 and Iq2 on an axis 'd' and an axis 'q' by coordinate conversion (three phase-to-two phase conversion) according to Equation (3) given below with the control electric angle θeset upon assumption that the sum of the phase currents Iu2, Iv2, and Iw2 flowing through the U phase, the V phase, and the W phase of the three-phase coils in the motor MG2 is equal to 0 (step S460):

$$\begin{bmatrix} Id2 \\ Iq2 \end{bmatrix} = \sqrt{2} \begin{bmatrix} \sin(\theta eset + \frac{\pi}{3}) & \sin(\theta eset) \\ \cos(\theta eset + \frac{\pi}{3}) & \cos(\theta eset) \end{bmatrix} \begin{bmatrix} Iu2 \\ Iv2 \end{bmatrix} \quad (3)$$

The CPU 40a then sets the electric current command Id2* of the axis 'd' at the control electric angle θeset based on the rotation restriction control torque Tm2 and sets the electric current command Iq2* of the axis 'q' to 0 (step S470). The electric current command Id2* in this embodiment is set to increase with an increase of the rotation restriction control torque Tm2, and is set to be capable of preventing rotation of the ring gear shaft 32a against the torque applied to the ring gear shaft 32a at magnitude that is less than or equal to the rotation restriction control torque Tm2 (within the range of the torque −Tm2 to the torque Tm2).

After setting the electric current commands Id2* and Iq2*, the CPU40a calculates a voltage commands Vd2* and Vq2* of the axis 'd' and the axis 'q' in the motor MG2 from the set electric current commands Id2* and Iq2* and the phase currents Id2 and Iv2 according to Equations (4) and (5) given below (step S480):

$$Vd2^* = k1(Id2^* - Id2) + \Sigma k2(Id2^* - Id2) \quad (4)$$

$$Vq2^* = k3(Iq2^* - Iq2) + \Sigma k4(Iq2^* - Iq2) \quad (5)$$

The voltage commands Vd2* and Vq2* of the axis 'd' and the axis 'q' are converted to voltage commands Vu2*, Vv2*, and Vw2* to be applied to the U phase, the V phase, and the W phase of the three-phase coils in the motor MG2 by coordinate conversion (two phase-to-three phase conversion) according to Equations (6) and (7) given below (step S490):

$$\begin{bmatrix} Vu2^* \\ Vv2^* \end{bmatrix} = \sqrt{\frac{2}{3}} \begin{bmatrix} \cos(\theta eset) & -\sin(\theta eset) \\ \cos(\theta eset - \frac{2\pi}{3}) & -\sin(\theta eset - \frac{2\pi}{3}) \end{bmatrix} \begin{bmatrix} Vd2^* \\ Vq2^* \end{bmatrix} \quad (6)$$

$$Vw2^* = Vu2^* - Vv2^* \quad (7)$$

The CPU 40a converts the voltage commands Vu2*, Vv2*, and Vw2* after the coordinate conversion into a PWM signal for switching transistors T7 to T12 of the inverter 42 (step S500), and outputs the converted PWM signal to transistors T7 to T12 of the inverter 42 to control the operations of the motor MG2 (step S510). The rotation restriction control reception second motor control routine is then terminated. In Equations (4) and (5), 'k1' and 'k3' represent proportionality coefficients, and 'k2' and 'k4' represent integral coefficients.

As described above, in response to a starting instruction of the engine 22 at the gearshift position SP set to the parking position, the hybrid vehicle 20 of the embodiment controls the motor MG2 to form the fixed magnetic field on the stator 46b of the motor MG2 with a level that is capable of restricting rotation of the ring gear shaft 32a or the rotating shaft against the torque applied to the ring gear shaft 32a at magnitude that is less than or equal to the rotation restriction control torque Tm2 based on the temperature αm2 of the motor MG2 and the discharge power Pb from the battery 50 (within the range of the torque −Tm2 to the torque Tm2), controls the motor MG1 to perform the motoring of the engine 22 while outputting the torque that makes magnitude of the torque applied to the ring gear shaft 32a to magnitude less than or equal to magnitude of a torque (Tm2−ΔT), and controls the engine 22 to be started with the motoring by means of the motor MG1. This arrangement effectively prevents rotation of the ring gear shaft 32a. Additionally, when the temperature αm2 of the motor MG2 is higher than the predetermined temperature αm2ref and when the discharge power Pb from the battery 50 is more than the predetermined electric power Pbref, the rotation restriction control torque Tm2 is set to be smaller than the rotation restriction control torque Tm2 that is set when the temperature αm2 of the motor MG2 is not higher than the predetermined temperature αm2ref and the discharge power Pb is not more than the predetermined electric power Pbref. This arrangement enables suppression of an excessive increase of the temperature αm2 of the motor MG2 and an excessive increase of the discharge power Pb from the battery 50.

In the hybrid vehicle 20 of the embodiment, the rotation restriction control torque Tm2 is set within the range less than or equal to the rotation restriction control torque limit Tm2lim that is set based on the temperature αm2 of the motor MG2 and the discharge power Pb from the battery 50. The rotation restriction control torque Tm2 may be set within the range less than or equal to the rotation restriction control torque limit Tm2lim that is set based on either the temperature αm2 of the motor MG2 or the discharge power Pb from the battery 50. The rotation restriction control torque Tm2 may be directly set based on at least one of the temperature αm2 of the motor MG2 and the discharge power Pb from the battery 50.

In the hybrid vehicle 20 of the embodiment, when the temperature αm2 of the motor MG2 is higher than the predetermined temperature αm2ref, the correction coefficient k1 is set to linearly decrease to 0 with the increase of the temperature αm2 of the motor MG2. The correction coefficient k1 may be set to a specific value (for example, 0.5) or to decrease step by step to 0 with the increase of the temperature αm2 of the motor MG2 when the temperature αm2 of the motor MG2 is higher than the predetermined temperature αm2ref. In the hybrid vehicle 20 of the embodiment, when the discharge power Pb from the battery 50 is more than the predetermined electric power Pbref, the correction efficient k2 is set to linearly decrease to 0 with an increase of the discharge power Pb from the battery 50. The correction coefficient k2 may be set to a specific value (for example, 0.5) or to decrease step by step to 0 with the increase of the discharge power Pb from the battery 50 when the discharge power Pb is more than the predetermined electric power Pbref.

In the hybrid vehicle 20 of the embodiment, the rotation restriction control torque limit Tm2lim is set to based on the temperature αm2 of the motor MG2. The rotation restriction control torque limit Tm2lim may alternatively be set based on a temperature of the inverter 42 or a temperature of the cooling water for cooling the motor MG2 and the inverter 42.

In the hybrid vehicle 20 of the embodiment, when the temperature αm2 of the motor MG2 is higher than the predetermined temperature αm2ref or when the discharge power Pb from the battery 50 is more than the predetermined power Pbref, the rotation restriction control torque Tm2 is set to be smaller than the rotation restriction control torque Tm2 that is set when the temperature αm2 of the motor MG2 is not higher than the predetermined temperature αm2ref and the discharge power Pb is not more than the predetermined electric power Pbref. When the CPU 72 estimates that the temperature αm2 of the motor MG2 may rise over the predetermined temperature αm2ref or when the CPU 72 estimates that the discharge power Pb from the battery 50 may exceed the predetermined electric power Pbref, even when the temperature αm2 of the motor MG2 is not higher than the predetermined temperature αm2ref and the discharge power Pb is not more than the predetermined electric power Pbref, the rotation restriction control torque Tm2 may be set be smaller than the rotation restriction control torque Tm2 that is set when the CPU 72 does not estimate these. This arrangement more effectively enables suppression of the excessive increase of the temperature αm2 of the motor MG2 and suppression of the excessive increase of the discharge power Pb from the battery 50, because the rotation restriction control torque Tm2 has been set to be relatively small from before the temperature αm2 of the motor MG2 rises over the predetermined temperature αm2ref or from before the discharge power Pb from the battery 50 exceeds the predetermined electric power Pbref. Whether the temperature αm2 of the motor MG2 may rise over the predetermined temperature αm2ref, for example, may be estimated based on the change of the temperature αm2 of the motor MG2 or the electric current flowing through the three phase coils of the stator 46b of the motor MG2. Whether the discharge power Pb from the battery 50 may exceed the predetermined electric power, for example, may be estimated based on the torque command Tm1* of the motor MG1 or the rotation restriction control torque Tm2.

In the hybrid vehicle 20 of the embodiment, at step S130 in the parking position start control shown in FIG. 3, the rotation restriction control torque Tm2 is set to the torque that is higher by the predetermined torque ΔT than the estimated shaft torque Trest that is estimated to be applied to the ring gear shaft 32a or the rotating shaft at the time when the motor MG1 outputs the torque corresponding to the torque command Tm1*. At steps S170 and S180 in FIG. 3, the torque command Tm1* of the motor MG1 is set to the torque that magnitude of the torque applied to the ring gear shaft 32a is smaller by the predetermined torque ΔT than the rotation restriction control torque Tm2. At step S130, the rotation restriction control torque Tm2 may be set to a torque equal to magnitude of the estimated shaft torque Trset. At steps S170 and S180, the torque command Tm1* of the motor MG1 may be set to a torque that makes a torque applied to the ring gear shaft 32a equal to the rotation restriction control torque Tm2. At steps S170 and S180, the torque command Tm1* of the motor MG1 may be set by using the torque limit Tm1lim of the motor MG1 calculated from the rotation restriction control torque Tm2, the predetermined torque ΔT and the gear ratio ρ of the power distribution integration mechanism 30 according to Equation (8) given below, in place of Equation (2) above. In this case, the estimated torque Trest is within the range of a torque (−Tm2+ΔT2/ρ) to a torque (Tm2−ΔT2/ρ). Therefore, this arrangement effectively prevents rotation of the ring gear shaft 32a. The value 'ΔT2/ρ' may be a value corresponding to the predetermined torque ΔT above.

$$Tm1lim = Tm2 \cdot \rho - \Delta T2 \qquad (8)$$

In the hybrid vehicle 20 of the embodiment, the motor MG2 is constructed as a three phase alternating current motor. The motor MG2 may be constructed a multiphase (not three phase) alternating current motor.

In the hybrid vehicle 20 of the embodiment, the motor ECU 40 sets the electric angle θe2 calculated at the time starting the motoring of the engine 22 as the control electric angle θeset. The control electric angle θeset is, however, not restrictively the electric angle θe2 calculated at the time starting the motoring of the engine 22. For example, the motor ECU 40 may sets the electric angle θe2 calculated before starting the motoring of the engine 22 as the control electric angle θeset.

In the hybrid vehicle 20 of the embodiment, the CPU 40a sets the electric current command Id2* of the axis 'd' at the control electric angle θeset based on the rotation restriction control torque Tm2 and sets the electric current command Iq2* of the axis 'q' to 0. The technique of the invention is applicable to fixing the direction of the magnetic field of the stator 46b of the motor by means of applying an electric current based on the rotation restriction control torque, to the motor MG2. The CPU 40a may control the motor MG2 without three phase-to-two phase conversion.

The hybrid vehicle 20 of the embodiment adopts the transmission 60 that has four speeds for the gear change. The number of speeds for the gear change is, however, not restricted to the four speeds. The transmission may have any number of speeds that is not less than 2 for the gear change.

Figure 10:
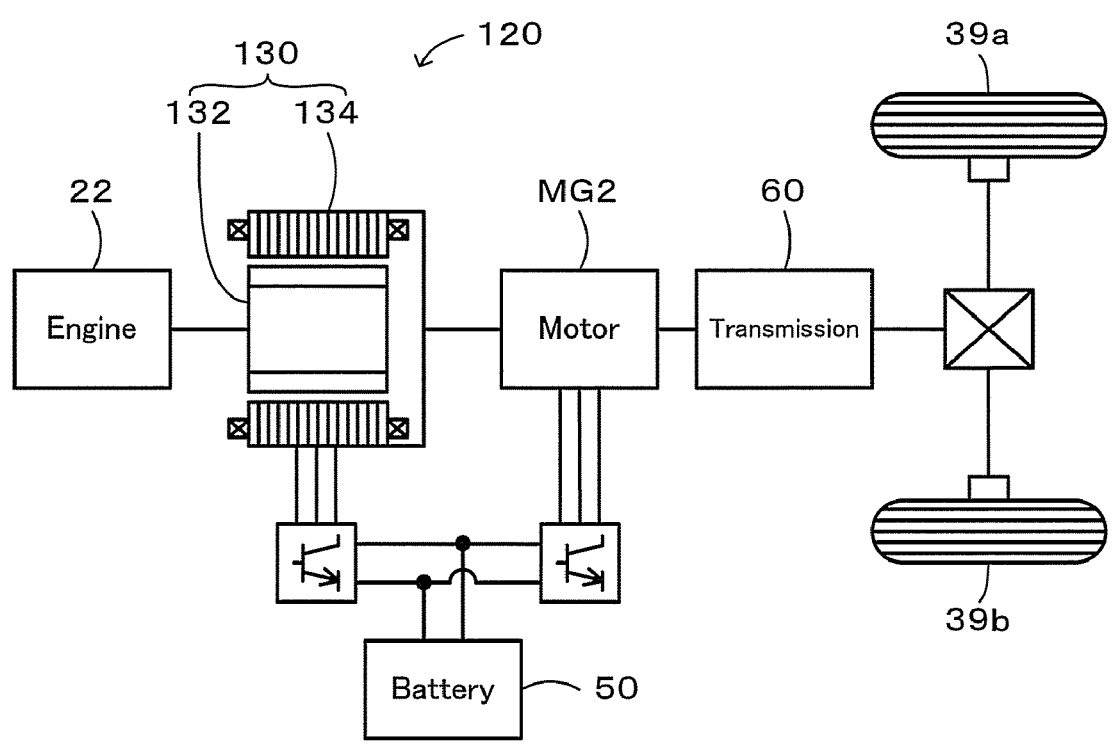
FIG. 10 schematically illustrates the configuration of another hybrid vehicle 120 in one modified example.

In the hybrid vehicle 20 of the embodiment, the power of the engine 22 is output via the power distribution integration mechanism 30 to the ring gear shaft 32a or the rotating shaft connected via the transmission 60 to the driveshaft 36 linked with the drive wheels 39a and 39b. The technique of the invention is also applicable to a hybrid vehicle 120 of another modified structure shown in FIG. 10, which is equipped with a pair-rotor motor 130. The pair-rotor motor 130 includes an inner rotor 132 connected to a crankshaft 26 of an engine 22 and an outer rotor 134 connected to a rotating shaft 32b that is linked via a transmission 60 to a driveshaft 36 for outputting power to drive wheels 39a and 39b. The pair-rotor motor 130 transmits part of the output power of the engine 22 to the drive wheels 39a and 39b via the rotating shaft 32b, the transmission 60, and the driveshaft 36, while converting the residual engine output power into electric power.

The embodiment regards application of the invention to the hybrid vehicle. This application is, however, only illustrative and not restrictive in any sense. The technique of the invention may be actualized by diversity of other applications, for example, various vehicles including automobiles and other vehicles as well as control methods of such various vehicles.

The primary elements in the embodiment and its modified examples are mapped to the primary constituents in the claims of the invention as described below. The engine 22 of the embodiment corresponds to the 'internal combustion engine' of the invention. The power distribution integration mechanism 30 and the motor MG1 of the embodiment corresponds to the 'motoring structure' of the invention. The power distribution integration mechanism 30 includes the carrier 34 linked to the crankshaft 26 of the engine 22, and the ring gear 32 linked to the ring gear shaft 32a or the rotating shaft. The motor MG1 is connected to the sun gear 31 of the power distribution integration mechanism 30. The motor MG2 of the embodiment corresponds to the 'motor' of the invention. The motor MG2 has a rotor 46a connected to the ring gear shaft 32a or the rotating shaft and drives and rotates the rotor 46a by the rotating magnetic field formed on the stator 46b to input and output the power from and to ring gear shaft 32a. The battery 50 of the embodiment corresponds to the 'accumulator unit' of the invention. The battery 50 transfers electric power to and from the motors MG1 and MG2. The transmission 60 of the embodiment corresponds to the 'transmission unit' of the invention. The transmission 60 allows and prohibits a transmission of power with a change in speed between the ring gear shaft 32a and the drive shaft 36 linked to the drive wheels 39a and 39b. The motor ECU 40, the hybrid electronic control unit 70 and the engine ECU 24 of the embodiment correspond to the 'control module' of the invention. In response to a starting instruction of the engine 22 at the gearshift position SP set to the parking position, the hybrid electronic control unit 70 executes the processing of setting the rotation restriction control torque Tm2 based on the temperature αm2 of the motor MG2 and the discharge power Pb from the battery 50, the processing of setting the torque command Tm1* of the motor MG1 within the range at which magnitude of the torque applied to the ring gear shaft 32a is less than or equal to the rotation restriction control torque Tm2, and the processing of instructing fuel injection control and ignition control when the rotation speed Ne of the engine 22 has reached the predetermined reference Nref with the motoring of the engine 22. The motor ECU 40 receives the rotation restriction control torque Tm2 from the hybrid electronic control unit 70 and controls the motor MG2 by applying the electric current, which is capable of preventing rotation of the ring gear shaft 32a against a torque applied to the ring gear shaft 32a at magnitude more than or equal to magnitude of the rotation restriction control torque Tm2 (a torque within the range of the torque −Tm2 to the torque Tm2), through the motor MG2. The motor ECU 40 controls the motor MG1 based on the motor command Tm1*. The engine ECU 24 performs fuel the injection control and the ignition control according to the instruction from the hybrid electronic control unit 70. This mapping of the primary elements in the embodiment and its modified examples to the primary constituents in the claims of the invention are not restrictive in any sense but are only illustrative for concretely describing some modes of carrying out the invention. Namely the embodiment and its modified examples discussed above are to be considered in all aspects as illustrative and not restrictive. The scope and spirit of the present invention are indicated by the appended claims, rather than by the foregoing description.

The embodiment and its modified examples discussed above are to be considered in all aspects as illustrative and not restrictive. There may be many other modifications, changes, and alterations without departing from the scope or spirit of the main characteristics of the present invention.

Industrial Applicability

The principle of the present invention is preferably applied to the manufacturing industries of vehicles.

What is claimed is:

1. A vehicle, comprising:
   an internal combustion engine;
   a motoring structure connected with an output shaft of the internal combustion engine and a rotating shaft and configured to perform a motoring of the internal combustion engine while outputting power to the rotating shaft;
   a motor that has a rotor connected with the rotating shaft and drives and rotates the rotor by a rotating magnetic field formed on a stator to input and output the power from and to the rotating shaft;
   an accumulator unit that transfers electric power to and from the motoring structure and the motor;
   a transmission unit configured to transmit power with a change in speed between the rotating shaft and an axle of the vehicle and to decouple the rotating shaft from the axle at least at a gearshift position set to a parking position; and
   a control module configured to, in response to a starting instruction of the internal combustion engine at a gearshift position set to a parking position, control the motor to fix a direction of a magnetic field formed on the stator with a level that is capable of restricting rotation of the rotating shaft against a shaft driving force defined as driving force applied to the rotating shaft within a driving force range set based on at least one of a state of a motor system including the motor and a state of the accumulator unit, control the motoring structure to perform a motoring of the internal combustion engine while outputting driving force that makes the shaft driving force within the driving force range, and control the internal combustion engine to be started with the motoring by the motoring structure.

2. The vehicle in accordance with claim 1, wherein the driving force range is set to a narrower range when a temperature of the motor system is more than a preset temperature than a range that is set when the temperature of the motor system is less than or equal to the preset temperature.

3. The vehicle in accordance with claim 2, the vehicle further having:
   a temperature rise estimating module configured to estimate that the temperature of the motor system may rise over the preset temperature,
   wherein the driving force range is set to a narrower range when the temperature rise estimating module estimates the temperature of the motor system may rise over the preset temperature than a range that is set when the temperature rise estimating module does not estimate that the temperature of the motor system may rise over the preset temperature.

4. The vehicle in accordance with claim 1, wherein the driving force range is set to a narrower range when a discharge power from the accumulator unit is over a preset electric power based on an output limit of the accumulator unit than a range that is set when the discharge power from the accumulator unit is less than or equal to the preset electric power.

5. The vehicle in accordance with claim 4, the vehicle further having:
   an electric power excess estimating module configured to estimate that the discharge power from the accumulator unit may exceed the preset electric power,
   wherein the driving force range is set to a narrower range when the electric power excess estimating module estimates that the discharge power from the accumulator unit may exceed the preset electric power than a range that is set when the electric power excess estimating module does not estimate that the discharge power from the accumulator unit may exceed the preset electric power.

6. The vehicle in accordance with claim 1, wherein the control module sets a target driving force to be output from the motoring structure, calculates an estimated shaft driving force estimated to be applied to the rotating shaft based on the set target driving force, and sets the driving force range based on the set estimated shaft driving force and at least one of the state of the motor system and the state of the accumulator unit.

7. The vehicle in accordance with claim 1, wherein the control module controls the motoring structure to output the driving force that makes the driving force applied to the rotating shaft within a second driving force range that is narrower than the driving force range.

8. The vehicle in accordance with claim 1, wherein the motoring structure is an electric power-mechanical power input output structure that is connected with the rotating shaft and with the output shaft of the internal combustion engine to enable rotation independently of the rotating shaft and inputs and outputs power into and from the output shaft and the rotating shaft through input and output of electric power and mechanical power.

9. The vehicle in accordance with claim 8, wherein the electric power-mechanical power input output structure includes:
   a three shaft-type power input output assembly connected with three shafts, the rotating shaft, the output shaft and a third shaft and designed to input and output power to a residual shaft based on powers input from and output to any two shafts among the three shafts; and
   a generator configured to input and output power from and to the third shaft.

10. A control method of a vehicle, the vehicle comprising: an internal combustion engine; a motoring structure connected with an output shaft of the internal combustion engine and a rotating shaft and configured to perform a motoring of the internal combustion engine while outputting power to the rotating shaft; a motor that has a rotor connected with the rotating shaft and drives and rotates the rotor by a rotating magnetic field formed on a stator to input and output the power from and to the rotating shaft;
   an accumulator unit that transfers electric power to and from the motoring structure and the motor; and a transmission unit configured to transmit power with a change in speed between the rotating shaft and an axle of the vehicle and to decouple the rotating shaft from the axle at least at a gearshift position set to a parking position; and,
   in response to a starting instruction of the internal combustion engine at a gearshift position set to a parking position, the control method controlling the motor to fix a direction of a magnetic field formed on the stator with a level that is capable of restricting rotation of the rotating shaft against a shaft driving force defined as driving force applied to the rotating shaft within a driving force range set based on at least one of a state of a motor system including the motor and a state of the accumulator unit, controlling the motoring structure to perform a motoring of the internal combustion engine while outputting driving force that makes the shaft driving force within the driving force range, and controlling the internal combustion engine to be started with the motoring by the motoring structure.

* * * * *